Feb. 11, 1964

A. E. LANDRY ET AL 3,121,143

ROTARY ELECTRIC SWITCH

Filed March 30, 1962

INVENTORS,
Alfred E. Landry
BY Philippe G. Roberts

S. J. Rotondi & A. T. Dupont

United States Patent Office 3,121,143
Patented Feb. 11, 1964

3,121,143
ROTARY ELECTRIC SWITCH

Alfred E. Landry, Burlington, and Philippe G. Roberts, Essex Junction, Vt., assignors, by mesne assignments, to the United States of America as represented by the Secretary of the Army Filed Mar. 30, 1962, Ser. No. 183,984
4 Claims. (Cl. 200—11)

This invention relates in general to electric circuit controllers, and more specifically to a novel switch for enabling one to switch a plurality of circuits from their normal mutually isolated condition to a commonly connected position.

The specific switch disclosed herein is especially designed for the control of testing circuits. However, it will be apparent, as the description proceeds, that the switch comprising this invention is readily adaptable to other uses where it is desired to short all the circuits of a system except a selected one.

Present day fire control and missile launch systems require that a plurality of tests be made in rapid succession with a minimum amount of delay. These tests are necessary before the systems are considered reliable and in the desired working condition. Due to the number of tests that must be necessarily performed and the usual complexity of these tests, the testing circuits and the switches used therein should be simple to operate and require a minimum number of testing operations by the operator. The test circuits and switches should also be highly reliable since a false reading would be highly undesirable. Also, since panel space is usually critical, the testing switches should require a minimum amount of panel space per circuit tested. They also should be light in weight and require as few moving parts as possible.

Various attempts have been made in the past to adapt presently known switching apparatus for use in test circuits but without any marked degree of success since all presently known switches suffer from a plurality of disadvantages. Among these disadvantages are the number of separate switches required, the complexity of the switching procedure and the time required to complete the testing where a plurality of separate switches are used. These disadvantages will be better understood by considering the present existing method used for testing.

The old method of testing required that each circuit that was to be checked be connected to a separate switch such as the well known toggle switch. One terminal of the toggle switch was connected to the circuit that was to be tested while the other terminal of the switch was connected to a terminal of the next switch or to a common ground connector. This wiring procedure was repeated until all the switches were wired into the circuit. With such a test circuit, each and every toggle switch had to be actuated to make all circuits common to one another. As can be seen, this arrangement, with each switch having its own operating handle, required considerable time to operate and usually involved a complex switching sequence. The use of a separate toggle switch for each circuit to be tested required a great amount of panel space on a per circuit basis. Presently known wafer switches are also undesirable for many of the same reasons. These wafer switches are also expensive to construct and are generally unreliable due to the number of these switches required to construct a test circuit.

It is a principal object of this invention to provide a novel unitary switching assembly of selector and shorting contacts which are adapted to be actuated by a single operation handle in predetermined sequence.

Another object of the present invention is to provide a control switch for operating a plurality of circuits, which switch is of compact and simplified construction for economical manufacture.

Yet another object of this invention is to provide a switch which is readily adaptable for use with conventional type electric switching circuits, and which is operable with speed and precision.

In describing my invention in detail, reference will be made to the accompanying drawings in which corresponding parts are generally identified by corresponding reference characters and in which.

Figures 1, 2, 3, 4:
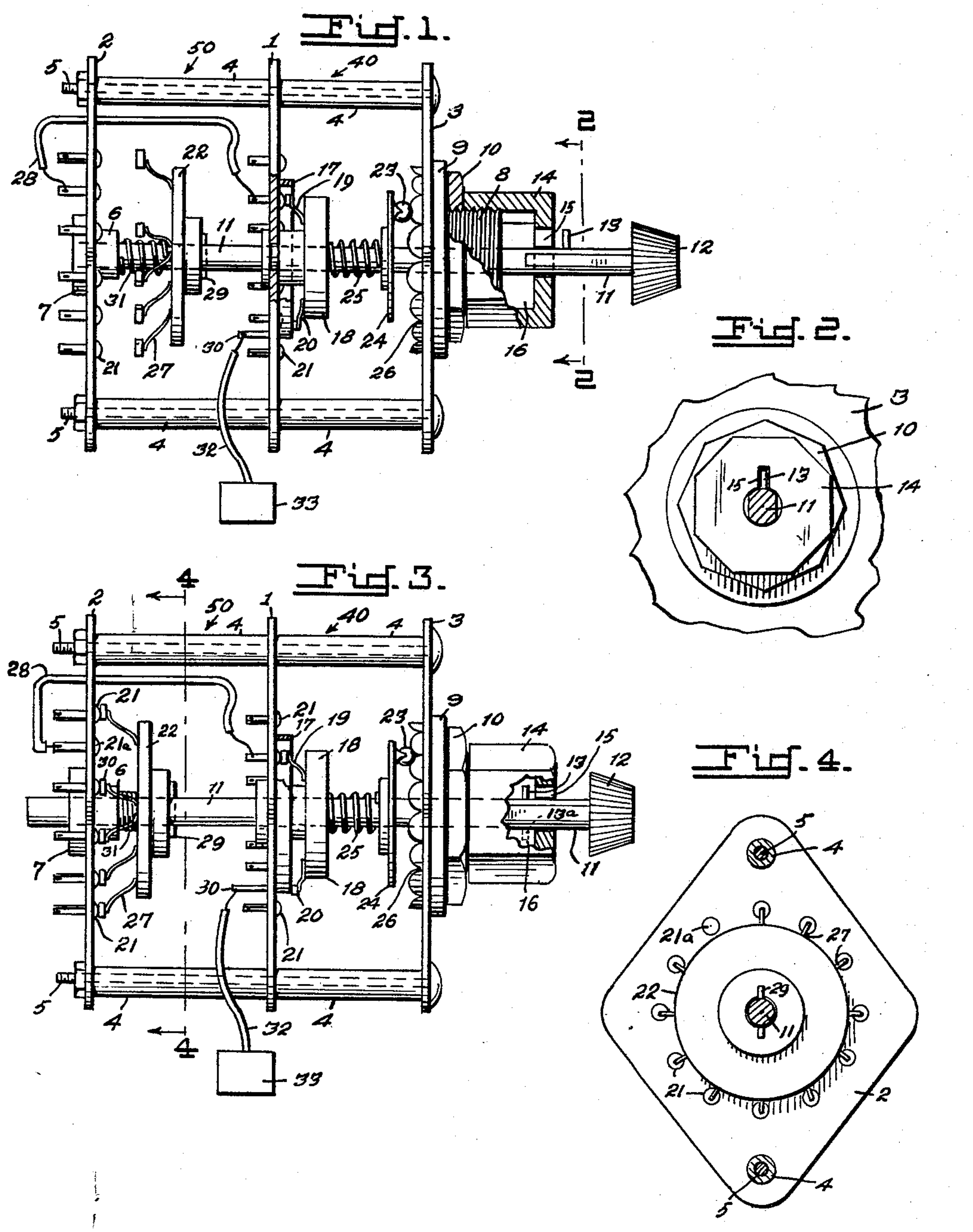
FIGURE 1 is a side elevation of the switch partly broken away to more clearly show the selector and shorting sections as well as the catch arrangement.
FIGURE 2 is a cross section of the switch shown in FIGURE 1 taken subsantially on line 2—2 thereof.
FIGURE 3 is a side elevation of the switch partly broken away and shown in the shorting position.
FIGURE 4 is a cross sectional view of the switch shown substantially on line 4—4 of FIGURE 3.

The switch contacts of the selector section 40 and shorting section 50, shown in FIGURES 1 and 3, are supported on two spaced supporting plates 1 and 2 which are of insulating material such as, for example, fiber, or a molded insulating material. The supporting plates are maintained in spaced relation with respect to each other and to a mounting panel 3 by spacer tubes 4. These spacer tubes are hollow thus allowing the passage of a bolt 5 through their center. The bolt is also passed through a hole in the mounting panel and support plates thereby holding the entire selector and shorting sections together and in spaced relationship. While the switch construction illustrated employs spacer tubes 4 at only two points, it is obvious that these spacer tubes may be provided at any desired number of points about the central axis.

Each supporting plate 1 and 2 has a central aperture for receiving a bearing sleeve 6 having an enlarged head 7 at one end thereof with each sleeve 6 being clamped into engagement with the supporting plate by appropriate means (not shown). The mounting panel 3 also is provided with a central aperture for receiving a bearing sleeve 8 having an enlarged head 9. The sleeve 8 is also clamped to the panel 3 by suitable means. The outer surface of sleeve 8 is threaded and has a mounting nut 10 located thereon for mounting the complete switch to any desired panel. A contact actuating shaft 11 is slidably and rotatably mounted in the bearing sleeves and is coupled to a manually operable knob 12. The shaft 11 is provided with a locking pin 13 which is secured to and adapted to move with the shaft. Mounted on the threaded sleeve 8 is a locking nut 14 having a groove or slot 15 located therein as best shown in FIGURE 2. The locking nut 14 is provided with a hollowed out portion 16 which is adapted to receive the pin 13 through the slot 15 and to allow the pin to rotate through 360°.

Each of supporting plates 1 and 2 is provided with an annular series of spaced contacts 21 which have integral rivet extensions extending through apertures in the supporting places. These extensions are peened over on the opposite sides of the plates to secure the contacts in operative position. Supporting plate 1 is also provided with a contact or slip ring 17 secured to the side thereof adjacent the sleeve 6. The contact ring 17 has an output terminal 30 secured thereto and is mounted on the supporting plate 1 by means of a rivet or other suitable mounting means not shown. Secured to the shaft 11 is a contact carrying support 18 which carries resilient contact brushes 19 and 20. The support 18 is constructed in such a manner that rotation of the shaft 11 will cause the support 18 to rotate, yet the shaft 11 is free to slidably move in a longitudinal direction through the support. Contact brush 19 is adapted to contact various ones of the spaced contacts 21 of plate 1 as the shaft is rotated while the brush 20 rides upon the common pickup or slip ring 17. Position interengagement of the brush contacts with the spaced contacts and slip ring is assured by means of the pressure exerted by spring 25 and the detent assembly which includes the ball mounted freely in the spring support plate 24. The ball is urged resiliently by the spring 25 toward the pockets 26 formed in the detent disc.

The shorting section 50 is also provided with a contact carrying support 22 which is secured to the operating shaft 11 so that rotation of the shaft will cause the support to rotate. A projection 29 is secured to the shaft 11 so that any longitudinal movement of the shaft will cause the support 22 to move in a longitudinal direction. Carried on the support 22 is a plurality of resilient shorting contact brushes 27 which are adapted to engage the terminals 21 when the support is moved in a longitudinal direction by the shaft 11. A spring 31 is used to resiliently urge the support 22 upward against the projection 29 thus preventing the shorting brushes 27 from normally contacting the spaced contacts 21. The brushes 27 may be made from a single sheet of contact material or by any other suitable method whereby each brush will be in electrical contact with every other brush carried by the support. The number of shorting contacts carried by the support will depend on how many contact terminals 21 are to be connected together when the shorting section of the switch is operated. In the present case there are shown twelve terminals (FIGURE 4) of which eleven are to be shorted together at the same instant, therefore eleven shorting brushes 27 are used in the present switch. As can be seen, no shorting brush is contacting terminal 21*a*, thus the external circuit which is to be connected to this terminal will not be shorted together with the other terminals. For purposes of explaining the operation of the shorting switch in a particular test circuit, an electrical conductor 28 is assumed to be connected between each of the corresponding terminals 21 of plates 1 and 2 thus arranging the terminals in pairs. For clarity only one such conductor 28 is shown but it is to be understood that other like conductors are connected between the other terminals of plates 1 and 2. An output circuit 33 is shown connected to the output terminal 30 of the slip ring 17 by an electrical conductor 32. This output circuit may be, for example, a meter which will indicate if the circuit under test is properly operating. No slip ring or associated contact is shown on plate 2 or support 22 but it is to be understood that they could be added if desired.

The operation of the shorting switch in relationship to one particular circuit arrangement may be explained substantially in the following manner. It is assumed that the system being tested requires that all the circuits to be tested be connected together except the circuit presently being checked. The circuits to be tested, which for purposes of clarity are not shown, are connected to the individual terminals of plate 2. As stated above, the terminals of plates 1 and 2 are connected together in corresponding pairs by electrical conductors 28. As shown by FIGURE 1, with the shorting switch in its open position, the spring 31 will keep the shorting brushes 27 from contacting the terminals 21 of plate 2 by pushing the support 22 up against the projection 29. Thus, the spring 31 normally holds the brushes 27 out of contact with the terminals 21.

To operate the switch, the knob is depressed (FIGURE 3) against the pressure of the spring 31 thereby moving the support 22 thus moving the contacts 27 carried by the support into contact with the terminals 21. With the shorting contacts 27 contacting the terminals 21, all the terminals and, thereby, all the circuits, except the circuit to be presently tested, are connected in common by the shorting brushes which are electrically connected together. The circuit connected to the terminal 21*a* will not be connected in common with the other circuit since there is no shorting brush connecting this terminal as shown by FIGURES 3 and 4. Also, since the terminals of plates 1 and 2 are connected together in pairs, the circuit connected to the terminal 21*a* of plate 2 will be connected through the brushes 19—20, terminal 30 and electrical conductor 32 to the output circuit 33. Under this condition, a reading or output signal may be taken from the circuit connected to the terminal 21*a*. To test the other circuits connected to the terminals, the knob 12 is rotated while held in its depressed condition. This causes the shaft 11 to rotate thereby moving the supports 18—22 and the retaining pin 13. The retaining pin, which moved into the hollowed out portion of the locking nut 14 through the groove or slot 15, will now engage against the inner surface of the nut 14 as shown by the broken line 13*a*. The engagement of the pin against the inner surface of the nut will prevent the spring 31 from returning the shorting brush to its normal noncontacting position even if the pressure exerted on the knob is removed. With the supports 18 and 22 rotated to the next terminal position, the next circuit to be tested will be connected to the output circuit 33 and the previous circuit which has just been tested will now be connected in common with the other circuits not presently under test. After the shaft 11 has been rotated through 360°, and all the circuits thereby tested, the pin 13 will be located in alinement with the groove or slot 15 thereby allowing the spring 31 to push the shorting brush 27 out of contact with the terminals 21 of plate 2.

If additional circuits are to be tested, the number of terminals carried by the plates may be increased or several switching units may be ganged together thereby forming a switch having increased capacity.

From the foregoing description and example it is readily seen that the present invention has many decisive advantages over heretofore known shorting switches. The present switch requires less space per circuit to be tested and fewer switch mounting holes. There are also fewer operating parts for a given number of circuits to be tested. It may also be seen that the present switch is more convenient to operate and eliminates the possibility of switching error during the operation since there are no complicated switching procedures that must be followed as is the case with conventional switches. This switch assembly also allows a decrease in switching time over other known switches. It will be obvious to persons skilled in the art that many changes and modifications may be made in the switch without departing from the broad spirit and scope of this invention as set forth in the claims.

What is claimed is:

1. A shorting switch comprising a first and second rotary wiper unit, the said wiper units comprising a nonconductive circular support disk, a first and second terminal plate, each plate consisting of insulating material and a plurality of metal electrical contact terminals fixed in spaced relation in the arc of a circle on the surface of the insulating material for successive engagement by the associated wiper unit, a continuous circular collector ring mounted on the first plate adjacent the contact terminals, a first wiper mounted on the first support disk for successively engaging the associated terminals of the first terminal plate one at a time, a second wiper mounted on the first support disk for continuously engaging the collector ring of the first terminal plate as the support disk is rotated, the first and second wipers being electrically connected, a plurality of electrically interconnected wiper brushes mounted on the second disk for simultaneously engaging and shorting together a plurality of the associated terminals of the second terminal plate, bushing means secured to the first and second plates in the center of the circle formed by the terminal supported by the said bushing means, chassis means for mounting said first and second terminal plates in parallel spaced relation, a rotary shaft slidably and rotatably supported in said chassis transversely of said first and second terminal plates, said wiper units mounted on said rotary shaft in fixed relationship thereto, the rotation of the said rotary shaft causing the support disks to rotate as a unit with said rotary shaft, a pin projection fixed on and adjacent the end of said rotary shaft, a locking nut located around the shaft and fixed to said chassis, said nut having a grooved opening in the end thereof for receiving the pin projection and being hollowed out so as to allow the pin to rotate within the nut as the shaft is rotated, a spiral spring bearing against the second plate and the second wiper unit to maintain said shaft and pin portions in normal longitudinal position, a knob secured to the end of the shaft for both rotating the shaft so that the contact of each wiper unit makes contact with a corresponding terminal of the associated plate and moving said shaft longitudinally against said spring while said pin projection and the groove are alined, said pin and locking nut being effective to hold the wiper brushes carried by the second disk in contact with the terminals carried by the second terminal plate throughout a cycle of operation.

2. A shorting switch according to claim 1 wherein the terminals carried by the first and second terminal plates are electrically interconnected to form pairs.

3. A shorting switch according to claim 2 wherein the number of brushes carried by the second disk is equal to the number of terminals on the second terminal plate minus one.

4. A shorting switch according to claim 3 wherein the first wiper mounted on the first support disk is in electrical contact with the terminal pair not contacted by the shorting brushes carried on the second disk.

References Cited in the file of this patent

UNITED STATES PATENTS

| | | |
|---|---|---|
| 2,416,972 | Williams et al. | Mar. 4, 1947 |
| 2,489,626 | Douchette | Nov. 29, 1949 |
| 2,576,836 | Hilsinger | Nov. 27, 1951 |
| 2,821,580 | Black | Jan. 28, 1958 |
| 2,963,920 | Hinsey | Dec. 13, 1960 |